United States Patent [19]
Przybylek

[11] 3,944,869
[45] Mar. 16, 1976

[54] DISPLAY PANEL WITH EXPANSIBLE, METALLIC CAPSULE CONTAINING MERCURY AND METHOD OF MAKING SAID CAPSULE

[75] Inventor: George J. Przybylek, Martinsville, N.J.

[73] Assignee: Burroughs Corporation, Detroit, Mich.

[22] Filed: Jan. 10, 1975

[21] Appl. No.: 540,050

Related U.S. Application Data

[62] Division of Ser. No. 355,178, April 27, 1973, Pat. No. 3,895,709.

[52] U.S. Cl. .................. 313/519; 29/422; 313/177; 313/220
[51] Int. Cl.² B23P 17/00; H01J 61/28; H01J 61/66
[58] Field of Search ........... 313/220, 177, 174, 519; 29/422

[56] References Cited
UNITED STATES PATENTS

| | | | |
|---|---|---|---|
| 1,855,760 | 4/1932 | Holborn | 313/177 X |
| 2,288,253 | 6/1942 | Reuter | 313/177 |
| 2,356,566 | 8/1944 | Clark et al. | 313/177 X |
| 2,469,975 | 5/1949 | McCloy | 29/422 X |
| 3,230,027 | 1/1966 | Mayer | 313/174 X |
| 3,300,037 | 1/1967 | DeSantis | 313/177 X |
| 3,334,407 | 8/1967 | DeSantis | 29/422 X |
| 3,558,957 | 1/1971 | Fehnel | 313/174 X |
| 3,684,345 | 8/1972 | Schiekel et al. | 316/4 |
| 3,720,452 | 3/1973 | Kupsky | 313/174 X |
| 3,828,218 | 8/1974 | Fehnel | 313/177 |

*Primary Examiner*—Palmer C. Demeo
*Attorney, Agent, or Firm*—Robert J. Gaybrick; Robert A. Green; William B. Penn

[57] ABSTRACT

A mercury capsule comprises a mercury-filled metal tube, of measured capacity, having closed ends, each of which includes end portions which are cold welded and resistance welded to form an hermetic seal and intermediate portions, which are crimped closed. The length of the intermediate crimped portions of each capsule is designed to permit the mercury within the capsule to expand and stress the lightly crimped portions, during processing operations of a device in which a capsule is mounted, without opening the hermetically sealed end portions of each capsule.

The method of the invention comprises filling a metal tube with mercury, closing the open end, and forming light crimps in the tube at spaced locations to form individual capsules, each of which is filled with a measured quantity of mercury. The crimped portions of the tube are processed to form lightly sealed portions on each side of the chamber which contains the mercury and tightly closed portions adjacent to the lightly closed portions at the ends of the capsules. The two closed portions have different resistance to opening under mercury vapor pressure at elevated temperatures, with the lightly closed portion being able to open at a temperature at which the tightly closed portion will not open.

3 Claims, 5 Drawing Figures

DISPLAY PANEL WITH EXPANSIBLE, METALLIC CAPSULE CONTAINING MERCURY AND METHOD OF MAKING SAID CAPSULE

CROSS-REFERENCE TO RELATED APPLICATION

This application is a division of Ser. No. 355,178, filed Apr. 27, 1973, now U.S. Pat. No. 3,895,709.

BACKGROUND OF THE INVENTION

For many years, display devices such as NIXIE tubes have used mercury vapor along with the normal inert gas content to minimize cathode sputtering. A NIXIE tube comprises a relatively large bulb or envelope in which is mounted a stack of glow cathodes in the form of characters. Mercury is usually introduced in such a device from a glass capsule which is disposed within the tube envelope and contains a ball of mercury. To release the mercury, the capsule is heated to cause the mercury to expand and break the glass.

Recently, thin, flat, gas-filled display panels have come into wide use, and these devices also use an inert gas and mercury vapor. A display panel generally comprises a thin, flat envelope including a base plate and a face plate. The base plate carries various electrodes including groups of glow cathodes, and the face plate carries the associated anodes for the groups of cathodes. The base plate and face plate are sealed together with a close spacing between them. Due to their construction, their gas volume, and the nature of their electrodes, display panels have a relatively strict requirement with respect to the quantity of mercury provided. However, glass capsules cannot be made in mass production so that they uniformly include the same measured quantity of mercury.

In addition, due to limited space in panel devices, the glass capsule cannot be mounted within the tube envelope, so it is mounted in a glass tubulation secured to the base plate of the panel and communicating with the interior of the panel through a hole in the base plate. The tubulation is used to evacuate the panel and to introduce the desired gas filling and mercury vapor. While this arrangement works well, the tubulation represents an item of expense which is considerable when millions of panels are manufactured, and it complicates processing of panels. In addition, the tubulation is fragile and is easily broken.

Another problem in panels arises from the fact that globules of mercury remain in the tubulation after the glass capsule has been broken and after the desired quantity of mercury vapor has entered the panel itself. Often, such globules enter the panel through the hole in the base plate when the panel is handled and during shipping. Such globules can cause problems in the panel, for example, by forming short circuits between closely spaced electrodes.

SUMMARY OF THE INVENTION

Briefly, a mercury capsule embodying the invention includes a mercury-containing portion, a lightly closed portion on either side thereof, and hermetically-sealed end portions.

DESCRIPTION OF THE PREFERRED EMBODIMENTS

Figure 1:
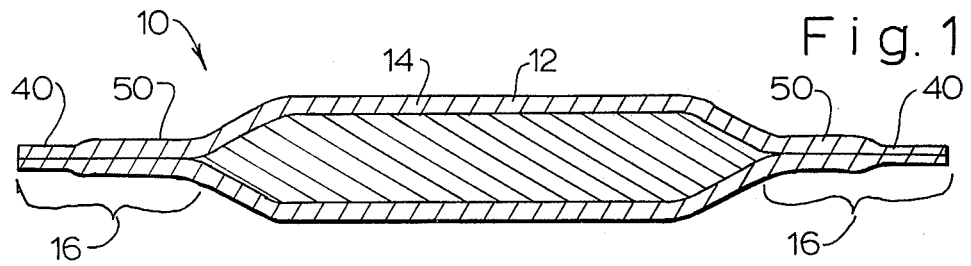
FIG. 1 is a sectional view of a mercury capsule embodying the invention.

A mercury capsule 10 embodying the invention is made of metal and includes a central chamber 12 which is filled with mercury 14. On either side of the central chamber, the capsule has closed portions 16 made up of lightly crimped portions 50 and, adjacent to portions 50, the ends 40 which are hermetically sealed so that the capsule is gas-tight.

Figure 2:
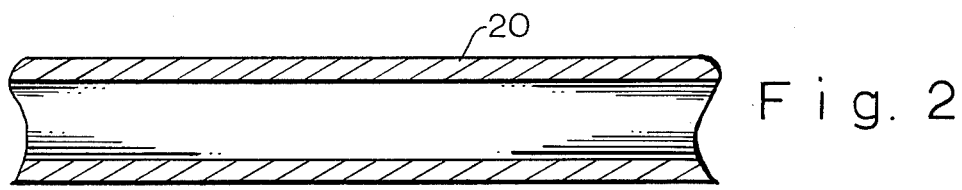
FIG. 2 is a sectional view of a tube used in making capsules of the type shown in FIG. 1.
Figure 3:
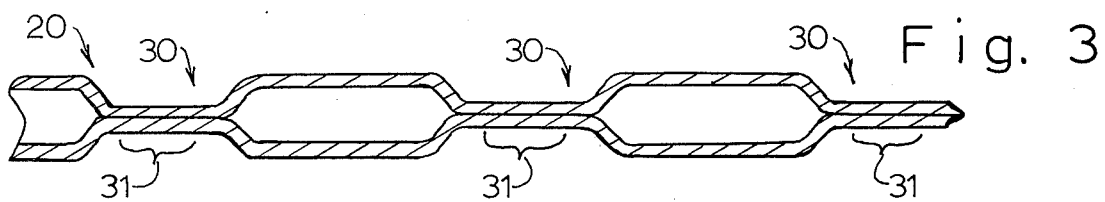
FIG. 3 is a sectional view of the tube of FIG. 2 at a stage in the manufacture of capsules of the type shown in FIG. 1.

According to the method of the invention, metal mercury capsules 10 are made from a metal tube 20 (FIG. 2) of titanium, iron, or the like, of generally circular cross-section, and having an outside diameter of about 20 mils and an inside diameter of about 10 mils. Mercury is poured into the tube 20 at one end, and, when the tube is filled, as indicated by the flow of mercury from the opposite end, one end is lightly crimped. Next, light crimps are formed in the wall of the tube at suitable spaced locations 30 along the tube to form individual capsules (FIG. 3), each of which is completely filled with a measured quantity of mercury.

Next, the central portions 31 of the crimped portions 30 of the tube 20 are tightly crimped and deformed to, in effect, form a cold weld. This cold welding operation is performed at such a pressure that a favorable resistance is formed, the resistance being optimal for a subsequent resistance welding operation. Those skilled in the art can readily determine the magnitude of pressure required to achieve the required cold weld and resistance.

Next, the cold welded regions are resistance welded to form heremetic seals which form the ends 40 of the individual capsules 10 which are formed when the tube 20 is broken up into the individual capsules 10 in any suitable manner. It is noted that the portion 50 of capsule 10 between the resistance weld seal area 40 and the central mercury-containing portion 12 is the portion which is lightly crimped but is not cold welded or resistance welded, for a purpose to be described.

Figure 4:
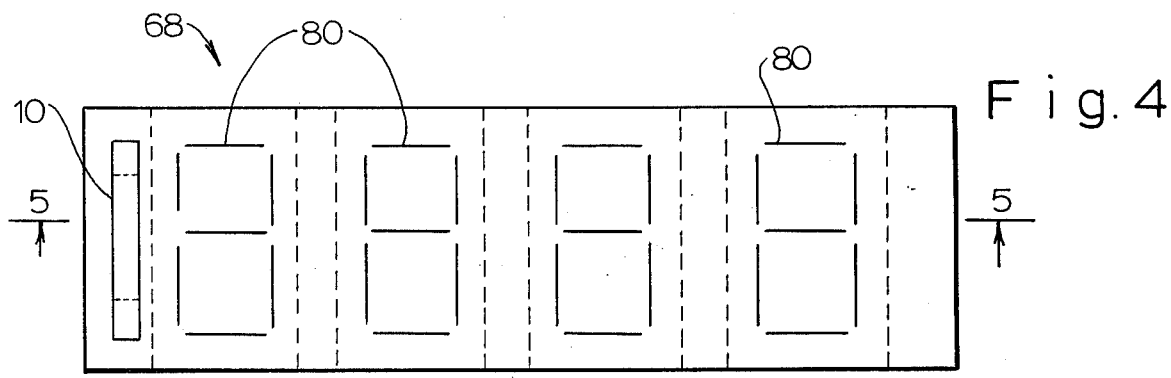
FIG. 4 is a plan view of a display panel which utilizes the capsule of the invention.
Figure 5:
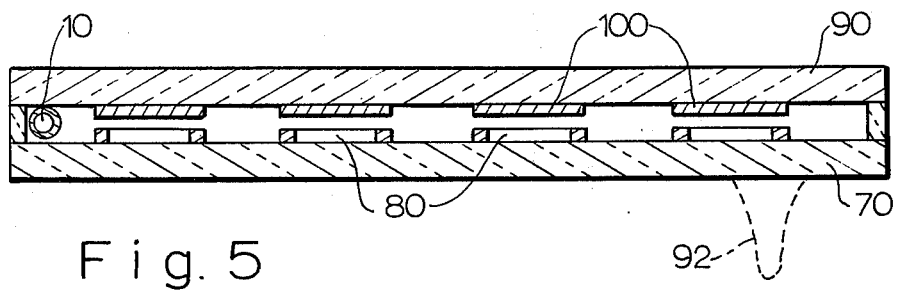
FIG. 5 is a sectional view of the panel shown in FIG. 4 including a mercury capsule.

In using a capsule 10, the capsule is mounted in the envelope of a display panel 68 of the type shown in copending application Ser. No. 173,854, filed Aug. 23, 1971, and now abandoned. A panel of this type, illustrated in FIGS. 4 and 5, includes, briefly, an insulating base plate 70, on which are supported a plurality of groups of cathode glow segments 80 and their associated conductors and other structural elements (not shown). The panel also includes an insulating face plate 90 spaced from and sealed to the base plate and carrying on its inner surface a transparent conductive anode 100 for each group of cathodes 80.

It is noted that the tubulation 92 (shown in dash lines) normally used in such panels and secured to the base plate, is not required in panel 68.

In one suitable arrangement, the capsule 10 is mounted at one end of the panel between the base plate 70 and face plate 90 and in close, heat-receiving relationship to the seal area between the base plate and face plate. The capsule is secured in place in any suitable manner. During the processing of the panel, relatively high temperatures are used, particularly during the making of the hermetic seal between the base plate and face plate which comprise the envelope of the display panel. During the sealing operation, the heat which is applied causes the mercury in the capsule 10 to expand. Because of the capsule construction, the expanding mercury can open the lightly crimped portions 50, if necessary; however, it does not affect the hermetically sealed end portions 40. At a desired time in the processing of the panel, a laser beam or other suitable means for providing focused energy, represented by arrow 100, is used to drill a small hole in the capsule 10 to permit mercury vapor to escape therefrom into the gas atmosphere of the panel.

A mercury capsule, according to the invention, used for providing mercury in display panels used in calculators, is of the order of 0.4 inch in overall length, the central mercury-containing portion is of the order of 0.2 inch in length, and the adjacent crimped portions are 0.1 inch in length, with the hermetically sealed end portions thereof being about 0.05 inch in length. Such capsules contain 6 mg. of mercury. Glass capsules of the prior art are perhaps five to six times larger than the metal capsule of the invention, and their mercury content varies from about 3 to about 8 mg. of mercury.

One immediately apparent advantage of the invention is that no tubulation is required and a panel can be baked out, filled with gas, and sealed in an oven. This simplifies the assembly operation and eliminates both the cost of the tubulation and the costs of handling the tubulation. Another advantage of the invention is that the small hole drilled in the metal mercury capsule does not permit globules of mercury to escape and enter the panel and cause problems. Still another important advantage is that each capsule made according to the invention includes the same measured quantity of mercury.

What is claimed is:

1. The method of making a metal mercury capsule insertable in a heat-sealed gas-filled display panel and expansible without rupture in the presence of heat comprising the steps of:

filling a metal tube with mercury;

lightly crimping said tube adjacent one end to close off said one end;

lightly crimping said tube along its length at uniformly spaced locations to form a plurality of longitudinally disposed capsules having crimped portions;

hermetically sealing said tube in a horizontal direction at said lightly crimped portion adjacent said one end and in a central portion of each of said lightly crimped portions uniformly spaced along said tube; and breaking up said tube at successive hermetically sealed portions to form individual capsules having hermetically sealed ends and expansible lightly crimped portions inwardly of said hermetically sealed ends.

2. A heat sealed display panel comprising:

an envelope including a flat base plate having a generally flat outer surface and an inner surface carrying a plurality of groups of cathode glow electrodes and means for making external connection thereto;

an anode electrode in said envelope for each of said groups of cathode electrodes;

a face plate having a viewing window and forming a gas-filled enclosure within said base plate;

said face plate being heat-sealed to said base plate along adjacent edge portions thereof to hermetically seal said envelope; and a metallic mercury-containing capsule disposed within said envelope and expansible without rupturing in the presence of heat generated as the envelope is hermetically sealed, said capsule being visible through said face plate whereby focused energy for rupturing said capsule can be transmitted to said capsule through said face plate.

3. The panel defined in claim 2 wherein said capsule is disposed within said envelope in heat-receiving relationship with the seal region between said face plate and said base plate.

* * * * *